United States Patent [19]

Beaumont et al.

[11] Patent Number: 5,231,332
[45] Date of Patent: Jul. 27, 1993

[54] AC ELECTRIC FIELD EMISSION SUPPRESSION IN CRT IMAGE DISPLAYS

[75] Inventors: Gregory J. Beaumont, Arlington Heights; Wayne D. Grocki, Libertyville, both of Ill.

[73] Assignee: Zenith Electronics Corporation, Glenview, Ill.

[21] Appl. No.: 868,922

[22] Filed: Apr. 15, 1992

[51] Int. Cl.[5] .............................. H01J 1/52; H01J 5/02
[52] U.S. Cl. ........................................ 315/85; 361/146
[58] Field of Search .................. 315/1, 8, 364, 399, 315/85; 361/146

[56] References Cited
U.S. PATENT DOCUMENTS 4,045,742 8/1977 Meehan et al. .................. 315/85 X
4,634,930 1/1987 Toshiyasu et al. ............... 315/85 X

OTHER PUBLICATIONS

"Electric Field Meter 200 Operator's Manual", Sections: 1.1 thru 1.4 (Introduction); no date.
MPR 1990:8 1990-12-01 "Test Methods for Visual Display Units" pp. 1–56.

Primary Examiner—David Mis

[57] ABSTRACT

An AC electric field emission suppressor for use in a CRT imaging system cancels the ripple voltage on the ultor voltage that generates the undesired emission. Ripple-cancelling pulses are derived from the horizontal deflection circuit and are capacitively coupled through the CRT wall to cancel the ripple voltage and suppress the undesired emission.

8 Claims, 3 Drawing Sheets

AC ELECTRIC FIELD EMISSION SUPPRESSION IN CRT IMAGE DISPLAYS

BACKGROUND OF THE INVENTION

This invention relates to cathode ray tube image displays, and is addressed to means for suppressing AC electric fields that emanate from the viewing screen of such displays. More particularly, the objective is to suppress such emissions to a level below the level of a recognized standard. The invention is applicable to both monochrome and color cathode ray tube image displays in which the viewer may be in close proximity to the faceplate, such as the viewers of television sets and visual display terminals.

The present invention had its origin in the concern over the possible detrimental effects of AC electric field emissions on the physiology of the viewers. Testing for such emissions in visual display terminals is described in a booklet published by the National Board for Measurement and Testing (MPR) of Sweden entitled "Test Methods for Visual Display Units: Visual Ergonomics and Emission Characteristics." MPR 1990:8 1990-1991, Boras, Sweden, pp. 51-56. This standard is known as "MPR-2."

The frequency range of interest specified in standard MPR-2 is 2 kHz to 400 kHz, in the very low frequency (VLF) region. The standard specifies an electric field level below 2.5 V/m in this region.

The funnel of a cathode ray tube (CRT) has an outer coating and an inner coating, both of which are electrical conductors and which may also be partially electrically resistive. The inner coating is located on the inside surface of the CRT funnel, and is electrically connected to a very thin, electrically conductive film of aluminum that covers the phosphor viewing screen located on the inner surface of the faceplate. The outer coating, located on the outside surface of the funnel, typically has an electrical resistance, known as the "sheet resistance," in the range of $2 \times 10^1$ to $2 \times 10^2$ ohms/square. In some applications, the outer coating may have no resistive component and comprise a resistance-free conductor. The inner coating typically has a sheet resistance of 400 ohms/square. In this disclosure, both coatings are electrically resistive. The coatings are made resistive primarily to leak off electrostatic charges which may otherwise build up on the coatings and initiate destructive arcing within the tube envelope.

The outer coating of the funnel is normally connected to ground, while the inner coating is at a electrical potential in the range of fifteen to thirty kilovolts, with the magnitude of the potential depending upon the type of CRT. This high potential, which is known as the ultor voltage, is generated by a high-voltage power supply and is routed to the inner coating by way of an anode button which penetrates the glass of the funnel. An uncoated, bare-glass area around the anode button isolates the high voltage on the anode button from the grounded outer coating.

A capacitor is thus formed which serves as a component of the filter circuit of the power supply, and in conjunction with other power supply components, acts to smooth out peaks in the output of the high-voltage power supply. As both the inner and outer coatings cover extensive areas inside and outside the funnel, the resulting capacitance is relatively large; that is, in the range of 1,000 to 2,000 picofarads.

The horizontal deflection circuit provides a train of pulses having a frequency of 15,705 Hz in monochrome television sets, a frequency of 15,734.26 Hz in color television sets, and frequencies of up to 150 kHz in some visual display terminals. The pulses are routed to the horizontal winding of a beam-deflection yoke, along with vertical deflection pulses from a vertical deflection circuit. The yoke impels the electron beam or beams to scan a raster on the phosphor viewing screen which is deposited on the inner surface of the faceplate.

Ideally, the ultor voltage is a fixed, constant voltage. However, the pulses of the horizontal deflection circuit are capacitively coupled from the yoke to the inner coating on the funnel, and to the high-voltage power supply that supplies the ultor voltage. As a result, ripples appear on the ultor voltage that induce undesired AC electric field emissions from the viewing screen of tube.

Attempts to reduce AC electric field emissions have included the shielding of the faceplate section of the CRT, and the use of additional filtering components in the horizontal deflection circuit and the high-voltage power supply. Such attempts have not been completely satisfactory in that they have been costly in terms of convenience, components, and performance.

OBJECTS OF THE INVENTION

It is a general object of the invention to a) suppress AC electric fields emitted from the viewing screens of CRT image displays b) suppress these emitted AC electric fields without recourse to shielding or additional filter components in the high-voltage supply;

c) suppress these emitted AC electric fields inexpensively by using readily available components arranged in simple circuits.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the several figures of which like reference numerals identify like elements, and in which:

DESCRIPTION OF THE PREFERRED EMBODIMENT

Figure 1:
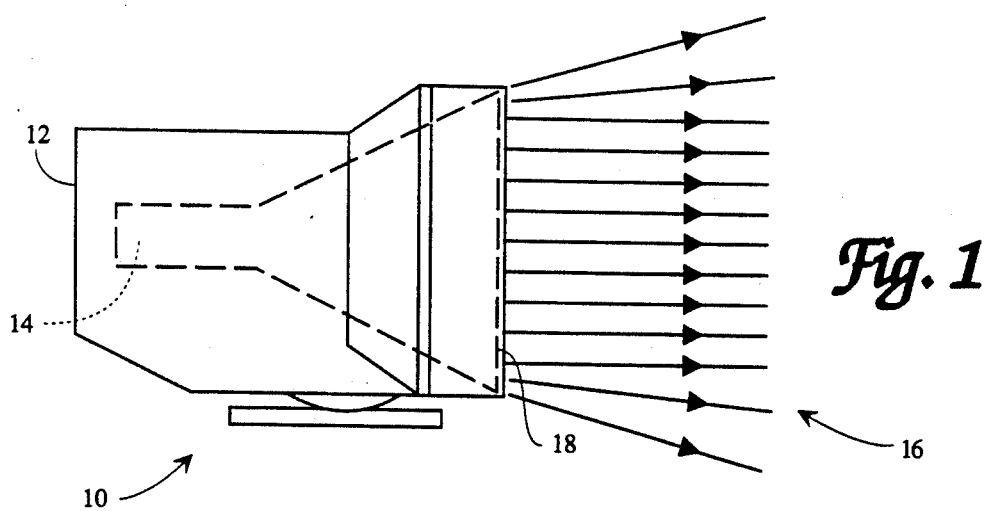
FIG. 1 is a side view of the cabinet of a video display terminal and includes a depiction of the emission of an AC electric field from the viewing screen a CRT enclosed in the cabinet.
Figure 2:
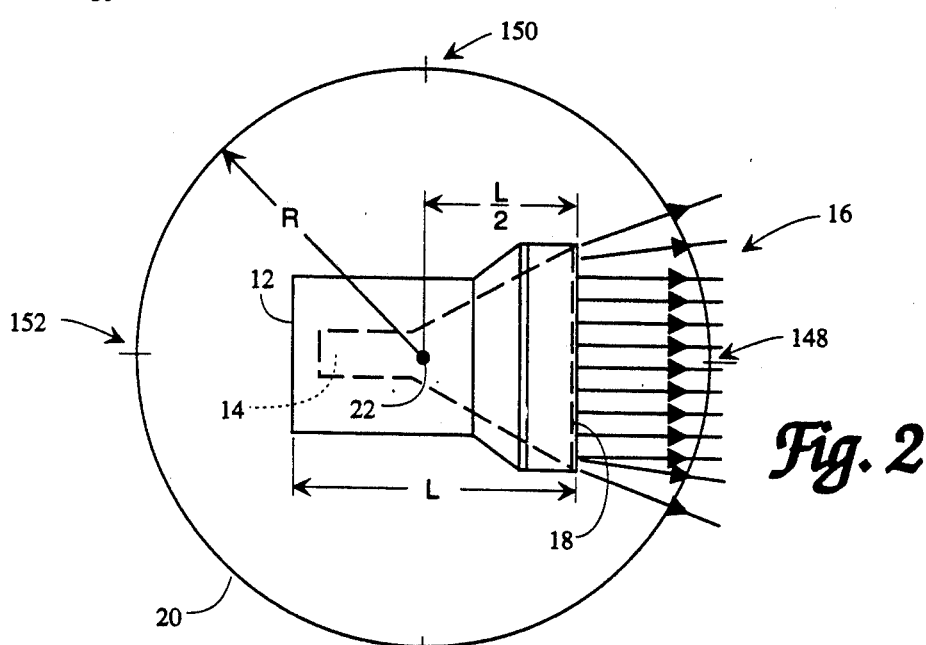
FIG. 2 is top view of the cabinet of FIG. 1, with the perimeter of the field of an AC electric field emission indicated.

With reference to FIGS. 1 and 2, there is depicted schematically a visual display terminal 10 comprising a cabinet 12 which encloses a CRT 14, indicated in phantom lines, and ancillary electronic circuits (not depicted). The arrows indicate an AC electric field emission 16 from the area of the faceplate 18 of the CRT 14. The perimeter line 20 drawn from the center point 22 of the cabinet 12 defines a plane for measurement of the intensity of the AC field emission, as will be described.

Figure 3:
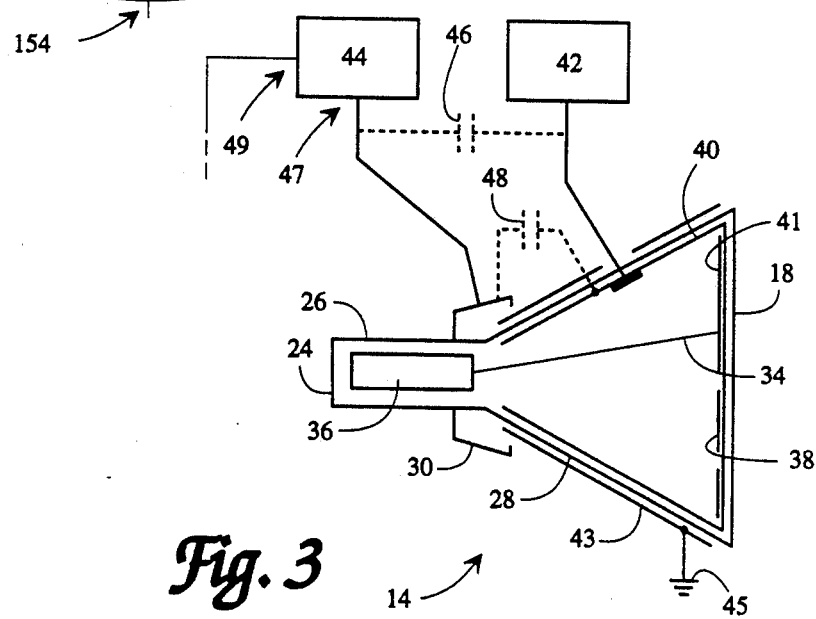
FIG. 3 depicts diagrammatically a CRT and the circuits that supply fixed and pulsating voltages for its operation.

FIG. 3 is a diagrammatic depiction of the CRT 14. Cathode ray tube 14 has a glass envelope 24 consisting of a neck 26, a funnel 28, and the faceplate 18. A yoke 30 receives pulses from a horizontal deflection circuit 44 which causes a beam 34 of electrons emitted by an electron gun 36 located in the neck 26 to sweep across a phosphor viewing screen 38 deposited on the inner surface of faceplate 18. In color tubes, three such beams are commonly employed.

A beam-sweeping horizontal deflection circuit typically emits a train of pulses having a voltage amplitude of 600 kilovolts to 1,000 kilovolts. The pulses are applied to the horizontal winding of a beam-deflecting yoke. Typically, in television sets and in most every type of raster scan system, the pulses are positive going.

An electrically conductive coating 40, noted as having an electrical resistance, is deposited on the inner surface of funnel 28. Inner coating 40 receives an ultor voltage from a high-voltage power supply 42. The ultor voltage potential is carefully regulated so as to comprise a substantially fixed potential. The ultor voltage is also routed to an anode (not shown) at the forward end of the electron gun 36 known as the ultor anode, which serves to accelerate the beam 34 (or beams) emitted by the gun 36.

The inner coating 40 is electrically connected to an electrically conductive aluminum film 41 which overlays phosphor viewing screen 38, thus causing viewing screen 38 to be electrically charged at the same potential as the inner coating 40. The outer coating 43 deposited on the outer surface of the funnel 28 is normally grounded, as indicated by the ground symbol 45.

The undesired AC electric field emission described in the foregoing results from the superimposing of a ripple voltage on the otherwise fixed ultor voltage present on inner coating 40. The ripple voltage comprises parasitic pulses which are capacitively coupled to the high-voltage supply 42 from the horizontal deflection circuit 44, a coupling indicated by phantom capacitor 46. Sweep pulses applied to yoke 30 by the horizontal deflection circuit 44 are also capacitively coupled to inner coating 40, with the coupling indicated by phantom capacitor 48.

The horizontal deflection circuit 44 is indicated as having two outputs. Output 47 provides a positive-going pulse to the yoke 30. Output 49 of the horizontal deflection circuit 44 is a negative-going pulse that is routed to certain of the ripple-voltage cancelling circuits depicted in FIGS. 5-8.

Figure 4A:
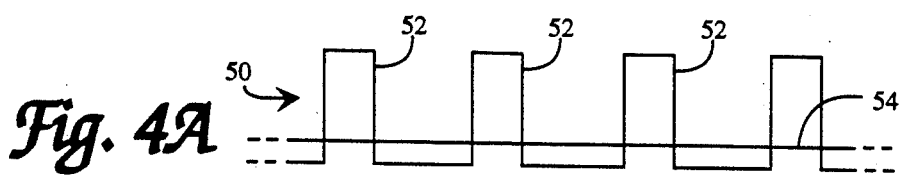
FIG. 4A is a waveform diagram of the undesired ripple component on the ultor voltage of the CRT of FIG. 3.

FIG. 4A is a waveform diagram that depicts a ripple voltage 50 as comprising a train of parasitic pulses 52 originating in a horizontal deflection circuit, and which are superimposed on the base line 54 that represents the ultor voltage. By way of example, parasitic pulses 52 may have an amplitude of ten to forty volts and the ultor voltage on base line 54 may be in the range of fifteen to thirty kilovolts. The ripple voltage 50 appears on the aluminum film 41 deposited on viewing screen 38 be way of inner coating 40. As indicated by FIGS. 1 and 2, the ripple voltage 50 on viewing screen 38 results in an undesired AC electric field emission 16 from the faceplate 18 of the tube 14.

The cancelling circuit according to the invention generates cancelling pulses that have a polarity opposite to the parasitic pulses of the AC ripple voltage. The cancelling pulses are capacitively coupled from the outer coating of the CRT to the inner coating, thereby cancelling the parasitic pulses of the ripple voltage and suppressing AC electric field emissions from the viewing screen of the faceplate.

Figure 4B:
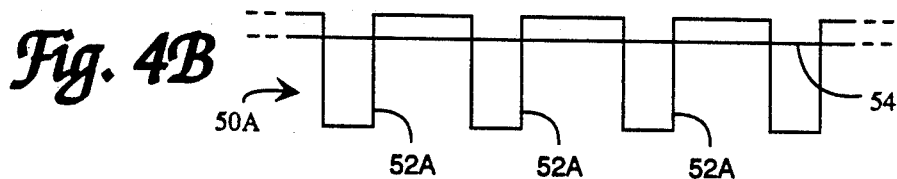
FIG. 4B is a diagram of the waveform of ripple-voltage-cancelling pulses.

The effect of the cancelling pulses is indicated in FIG. 4B, wherein a train of ripple-voltage-cancelling pulses 50A comprising pulses 52A are depicted diagrammatically as being superimposed on the base line 54 that represents the ultor voltage. As indicted, each parasitic pulse 52 is cancelled according to the invention by a cancelling pulse 52A having an opposite polarity and substantially the same amplitude.

Figure 5:
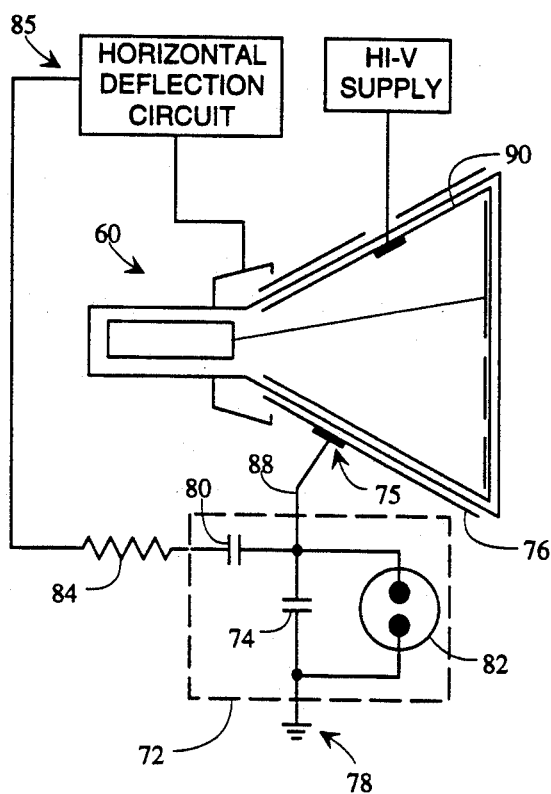
FIGS. 5-8 are schematic diagrams of circuits for coupling ripple-voltage-cancelling pulses according to the invention into a CRT. The coupling circuits comprise, respectively, a capacitive divider, a resistive divider, an injection resistor, and a transformer.
Figure 6:
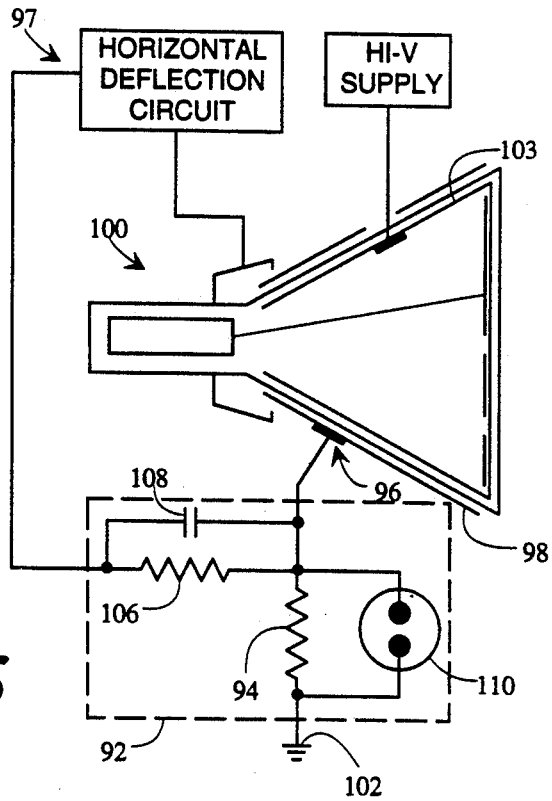
Figure 7:
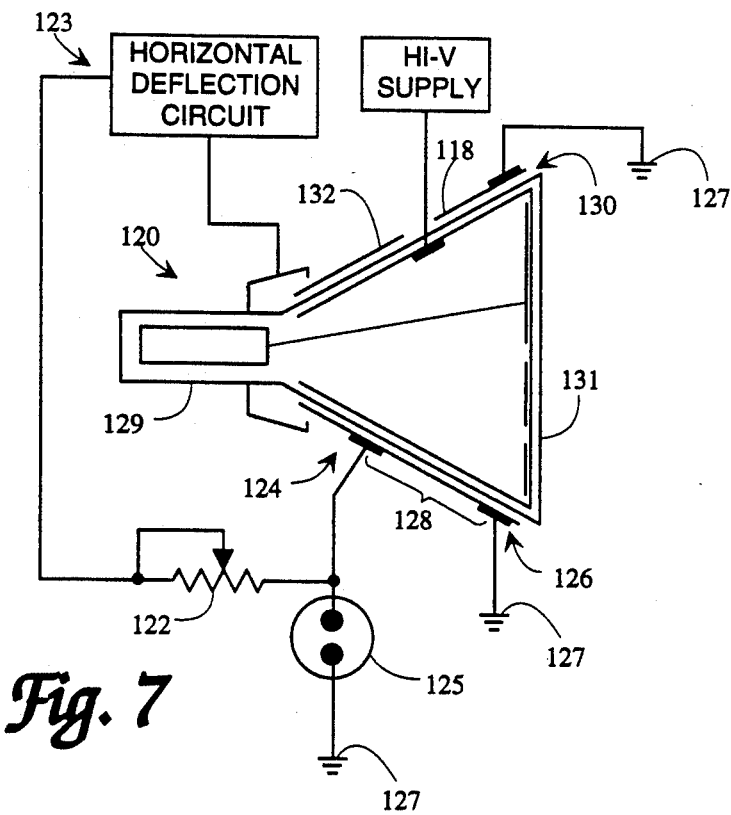
Figure 8:
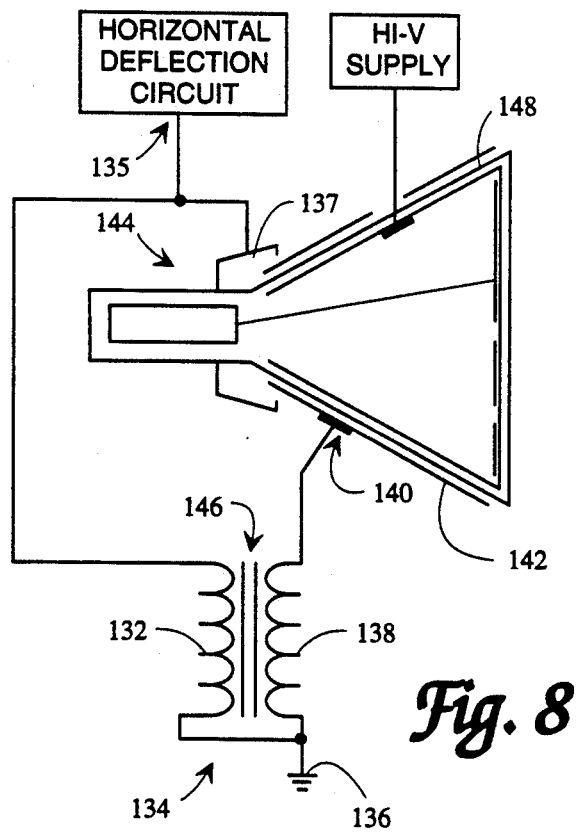

Circuits for cancelling a ripple voltage according to the invention are described in connection with FIGS. 5-8. The circuit of FIG. 5 is a preferred embodiment, and the circuits of FIGS. 6-8 are alternate embodiments. The component values cited in the description, such as for resistance and capacitance, are by way of example; the exact values will depend upon the type of CRT with which they are used.

In the following FIGS. 5-8, the high-voltage supply and the horizontal deflection circuits are identical to those described in connection with FIG. 3, hence they are not numbered but are labeled with the abbreviations HI-V SUPPLY and HORIZ DEFL CIRCUIT, respectively. The "ground" in each example is the common ground for all the electronic circuits of the CRT image display. The spark gap components are all identical.

A capacitive divider circuit 72 for cancelling ripple voltage pulses on the ultor voltage for AC electric field emission suppression is shown schematically in FIG. 5. A first capacitor 74 is connected between a selected connection point 75 on the outer coating 76 of CRT 60 and ground 78. A second capacitor 80 is connected between the selected connection point 75 in series relationship with a resistor 84, which in turn is connected to a negative-going output 85 of the horizontal deflection circuit; it is thus that ripple-voltage-cancelling pulses are derived from a horizontal deflection circuit. A spark gap 82 in parallel connection with first capacitor 74 ensures that the outer coating 76 remains at a low AC potential above ground 78. In the absence of the spark gap 82, a high electrical potential can build up on outer coating 76 when an electrical flashover occurs within the tube envelope.

The series resistor 84 provides for damping parasitic resonances and prevents ringing of the circuit. It may also modify the shape of the correction pulses to make them more nearly match the shape of the parasitic pulses of the ripple voltage. Resistor 84 may have a value in the range of 1 to 10 ohms, capacitor 80 a value in the range 0.001 to 0.033 microfarads, and capacitor 74 a value in the range of 0.02 to 0.068 microfarads. The spark gap 82 may comprise a two-electrode, medium-duty gas tube surge voltage suppressor with a DC breakdown voltage of 75 to 800 volts. A suitable spark gap comprises a Series TO8 Voltage Suppressor supplied by World Products, Inc., of Sonoma, Calif. Other spark gaps may as well be used.

Conductor 88 is electrically and mechanically connected to the outer coating 76 at connection point 75. The connection may be made by an electrically conductive cement, or by a pressure-type electrical connector. As the material of the outer coating 76 is very thin, the area of connection should be at least an inch in diameter to provide a connection having zero resistance. It is by this means that the ripple-voltage-cancelling pulses are coupled to the outer coating 76.

Further, the cancelling pulses are capacitively coupled between the outer coating 76 and the inner coating 90 to cancel parasitic pulses on the ultor voltage and suppress AC electric field emissions from the viewing screen. The cancelling pulses are coupled from the outer coating 76 to the inner coating 90 across the glass of the funnel, which acts as a dielectric.

A resistive voltage divider circuit 92 for cancelling ripple voltage pulses to suppress AC electric field emissions is shown schematically in FIG. 6. A first resistor 94 is connected between a selected connection point 96 on the outer conductive coating 98 of CRT 100 and ground 102. The inner coating 103 of CRT 100 receives an ultor potential from the high-voltage power supply. The function of first resistor 94 is to elevate the outer coating 98 above ground 102, and by virtue of its relatively low resistance, it will maintain electromagnetic interference shielding of the outer coating. A spark gap 110 in parallel connection with resistor 94 performs the same function as the spark gap 82 described heretofore in connection with FIG. 5, and has the same characteristics.

A second resistor 106 is connected between the selected connection point 96 and a negative-going 97 output of the horizontal deflection circuit. A phasing capacitor 108 is connected in parallel with second resistor 106. The function of phasing capacitor 108 is to modify the shape of the waveform formed by the ripple-voltage-cancelling pulses derived from the horizontal deflection circuit so as to match the shape of the parasitic pulses of the ripple voltage.

First and second resistors 94 and 106 each may have a resistance in the range of 100 to 2000 ohms. Capacitor 108 may have a capacitance in the range of 50 to 250 picorfarads.

A simplified voltage divider for coupling ripple-voltage-cancelling pulses into a CRT envelope is depicted in FIG. 7. A first resistor 122, termed an injection resistor, is connected between a fir≦t connection point 124 on the outer coating 118 of CRT 120 and a negative-going output 123 of the horizontal deflection circuit. A spark gap 125 connected in series between first connection point 124 and ground 127 provides protection against flashover.

The voltage potential at connection point 124 is a function of the ohmic value of resistive path 128 on the outer coating 118 that lies between first connection point 124 and a second connection point 126, which is connected directly to ground 127. The resistive path 128 is indicated by the bracket. In effect, injection resistor 122 is in series with resistance path 128, forming a voltage divider. The resistance of the outer coating 118 along resistive path 128 functions as a shunt ground leg. As a result, a pulse voltage injected at first connection point 124 will produce a voltage gradient across the outer coating 118 along resistive path 128.

This approach is relatively less effective in raising the outer coating 118 of CRT 120 to a uniform potential, and will require an increase in the voltage of the pulses from the horizontal deflection circuit to compensate for the resistance gradient of the resistive path 128. As a result, this approach has the highest power consumption of the described embodiments.

Injection resistor 122 comprises a variable resistor having a range of 100 to 2,0000 ohms. The value of resistive path 128 is from 40 to 250 ohms, if its length is measured, as roughly indicated, from the neck 129 of the CRT 120 to the edge of the faceplate 131 where the outer coating 118 ends.

It is noteworthy that the resistive path can be lengthened to provide an increase in resistance by relocating a connection point on the outer coating 118 to a more remote area, such as the area of a connection point 130 on the other side of the funnel 132, shown as being connected to ground 127. Thus the resistance of resistive path 128 can be made variable, with the amount of resistance dependent on the location of the second grounding point 130.

As indicated in FIG. 8, transformer coupling provides another simple yet effective way to couple ripple-voltage-cancelling pulses into a CRT envelope. The primary winding 132 of transformer 134 is shown as being connected between an output 135 of the horizontal deflection circuit and ground 136. It will be noted that output 135 will supply a pulse of the same polarity as is applied to the yoke 137, that is, a positive-going pulse that is inverted in transformer 134. The secondary winding 138 of transformer 134 is connected between connection point 140 on the outer coating 142 of CRT 144, and ground 136.

The core 146 of the transformer 134 consists of a high-frequency ceramic material such as Ferronics toroidal core material No. 11-260-8, manufactured by Ferronics, Inc., East Rochester, N.Y. Ferrite is preferred as a core material because of its permeability and low eddy current loss. The primary winding 132 consists of about 25 turns of AWG No. 30 or 36 wire. The secondary winding 138 consists of a three-eighths inch band of metal passing through the toroidal material of core 146.

The are several benefits to transformer injection of cancelling pulses. The outer coating 142 of the funnel 148 of CRT 144 remains connected to ground, the transformer can accept pulses of either polarity, and the power consumption is lowest of the described embodiments. Also, by increasing the turns ratio, the transformer can reduce the amplitude of high voltage pulses taken directly from the output of flyback transformer of the horizontal deflection circuit to the level that matches the amplitude of the parasitic pulses of the ripple voltage.

Coupling by transformer is slightly less economical than the circuits previously described because the transformer is an especially manufactured component. However, any increase in cost is offset over the long run by a reduction in power consumption.

In order to effectively cancel the pulses of the ripple voltage according to the invention, the cancellation pulses must be opposite in polarity and have an amplitude equal to or greater than the parasitic pulses comprising the ripple voltage. Because of this requirement, it is necessary to locate a connection source within the horizontal deflection circuit that can supply cancelling pulses of the proper polarity and proper amplitude. This means that for every type of CRT image display system, an analysis must be made of the characteristics of the pulses of the parasitic ripple voltage, such as the frequency, amplitude and polarity, so that these characteristics can be matched by the ripple-voltage-cancelling pulses.

The strength of the AC electric field emission is determined by means of a meter capable of measuring alternating electric fields below 2.5 V/m in the 2 kHz to 400 kHz (VLF) range. A suitable instrument is Electric Field Meter EFM 200 manufactured by Combinova AB, Bromma, Sweden. The United States representative of this company is Ergonomics, Inc. of Southhampton, Pa.

The pattern for measurement of AC electric field emission strength is indicated by FIG. 2. Measurements are made every 90 degrees on the perimeter line 20, as indicated by measurement points 148, 150, 152 and 154. The circumference of perimeter line 20 is plotted from the center 22 of the monitor cabinet 12. The distance R, or radius, in meters between the center 22 of the monitor cabinet 12 and the perimeter line 20 is determined by the formula $R = L/2 + 0.5$ m, where L is the front-to-back dimension of the cabinet 12.

The benefits of the invention include

1. A reduction of AC electric field emissions well below the limit set by standard MPR-2.

2. The reduction is accomplished without the need for auxiliary shielding around the faceplate or additional filtering of the high-voltage power supply and the horizontal deflection circuit.

3. The reduction can be accomplished with readily available components arranged in simple circuits.

4. No modification of the high-voltage power supply or the horizontal deflection circuit is required.

5. The simplicity of the circuits according to the invention makes for easy and economical manufacture and installation, and for long-term reliability.

While a particular embodiment of the invention has been shown and described, it will be readily apparent to those skilled in the art that changes and modifications may be made in the inventive means and method without departing from the invention in its broader aspects, and therefore, the aim of the appended claims is to cover all such changes and modifications as fall within the true spirit and scope of the invention.

We claim:

1. An improved CRT imaging system having an AC electric field emission suppressor for cancelling a ripple voltage which induces an undesired AC electric field emanating from the viewing screen of the CRT imaging system, the CRT having an electrically conductive inner coating and an electrically conductive outer coating, each coating having an electrical resistance, the imaging system further including:
   a beam-sweeping horizontal deflection circuit and a high-voltage supply for charging the inner coating and the viewing screen with an ultor voltage, the ultor voltage having parasitic pulses thereon originating in the horizontal deflection circuit;
   the imaging system characterized by having a circuit for cancelling the ripple voltage comprising:
   a) means for deriving from the horizontal deflection circuit ripple-voltage-cancelling pulses having a polarity opposite to that of the parasitic pulses;
   b) means for coupling the ripple-voltage-cancelling pulses to the outer coating;
   whereby the ripple-voltage-cancelling pulses are capacitively coupled between the outer coating and the inner coating to cancel parasitic pulses on the ultor voltage, thereby suppressing AC electric field emissions from the viewing screen.

2. The improved CRT imaging system according to claim 1 wherein a wall between the outer coating and the inner coating acts as a dielectric to form a capacitor.

3. The improved CRT imaging system suppressor according to claim 1 in which the ripple-voltage-cancelling pulses are coupled to the outer coating of the CRT by capacitive divider means comprising:
   a) a first capacitor connected between a selected connection point on the outer coating and ground;
   b) a resistor having a first lead and second lead, with the first lead connected to an output of the horizontal deflection circuit;
   c) a second capacitor connected between the selected connection point on the outer coating and the second lead of the resistor;
   d) a spark gap in parallel connection with the first capacitor.

4. The improved CRT imaging system according to claim 1 in which the ripple-voltage-cancelling pulses are coupled to the CRT by voltage divider means comprising:
   a) a first resistor connected between a selected point on the outer coating and ground;
   b) a second resistor connected between the selected point on the outer coating and an output of the horizontal deflection circuit;
   c) a capacitor in parallel connection with the second resistor; and
   d) a spark gap in parallel connection with the first resistor.

5. The improved CRT imaging system according to claim 1 in which the ripple-voltage-cancelling pulses are coupled to the CRT by simplified voltage divider means, comprising:
   a) a first resistor connected between a first connection point on the outer coating and an output of the horizontal deflection circuit;
   b) a second resistor comprising a selected resistive path on the outer coating between the first connection point and a second, grounded connection point remote from the first connection point; and
   c) a spark gap connected between the first connection point and ground,
   whereby the first resistor and the selected resistive path forms a voltage divider for imparting ripple-voltage-cancelling pulses to the outer coating which are in turn capacitively coupled from the outer coating to the inner coating, and whereby the resistance of the selected resistive path is variable depending on the location of the second grounded connection point.

6. The improved CRT imaging system according to claim 1 in which the ripple-voltage-cancelling pulses are coupled to the CRT by transformer means comprising:
   a) a primary winding connected between the output of the horizontal deflection circuit and ground;
   b) a secondary winding connected between the outer coating and ground; and
   c) a core located between the primary winding and the secondary winding;
   whereby the ripple-voltage-cancelling pulses are inductively coupled to the outer coating, and in turn, capacitively coupled from the outer coating to the inner coating for the suppression of AC electric field emissions.

7. The improved CRT imaging system according to claim 6 wherein the core is composed of a ferrite.

8. A method of AC electric field emission suppression for cancelling an undesired electric field emanating from the viewing screen of a CRT imaging system the AC electric field induced by ripple voltage pulses capacitively coupled from a horizontal defection circuit onto an ultor voltage, the imaging system including a CRT having a glass funnel with an electrically conductive outer coating and an electrically conductive inner coating, the method including the steps of:
a) deriving, from the horizontal deflection circuit, ripple-voltage cancelling pulses with a polarity opposite to the ripple voltage;
b) capacitively coupling the ripple-voltage cancelling pulses from the outer coating to the inner coating across the glass of the funnel which acts as a dielectric;
thereby cancelling the ripple voltage on the ultor voltage and suppressing AC electric field emissions from the viewing screen.

* * * * *